(12) United States Patent
Loeb

(10) Patent No.: US 7,683,771 B1
(45) Date of Patent: Mar. 23, 2010

(54) CONFIGURABLE CONTROL PANEL AND/OR DASHBOARD DISPLAY

(76) Inventor: Barry Loeb, 14 Jeanette Dr., Port Washington, NY (US) 11050

( * ) Notice: Subject to any disclaimer, the term of this patent is extended or adjusted under 35 U.S.C. 154(b) by 293 days.

(21) Appl. No.: 11/690,940

(22) Filed: Mar. 26, 2007

(51) Int. Cl.
*B60Q 1/00* (2006.01)
(52) U.S. Cl. .......................... 340/461; 340/438; 701/1; 715/700
(58) Field of Classification Search ............... 340/461, 340/971, 438, 441, 945; 701/1, 4, 36; 345/970, 345/705, 339, 1.1; 353/13; 715/700
See application file for complete search history.

(56) References Cited

U.S. PATENT DOCUMENTS

| 3,659,283 | A | | 4/1972 | Ophir |
| 4,442,424 | A | | 4/1984 | Shirasaki et al. |
| 4,594,572 | A | | 6/1986 | Haubner et al. |
| 4,630,043 | A | | 12/1986 | Haubner et al. |
| 5,278,532 | A | | 1/1994 | Hegg et al. |
| 5,847,704 | A | * | 12/1998 | Hartman ...................... 715/764 |
| 6,253,122 | B1 | | 6/2001 | Razavi et al. |
| 6,667,726 | B1 | | 12/2003 | Damiani et al. |
| 6,812,942 | B2 | * | 11/2004 | Ribak ........................... 345/30 |
| 6,842,122 | B1 | * | 1/2005 | Langner et al. ............. 340/945 |
| 6,842,677 | B2 | * | 1/2005 | Pathare ........................ 701/36 |
| 7,131,728 | B2 | * | 11/2006 | Nambudiri et al. ............ 353/13 |
| 7,441,189 | B2 | * | 10/2008 | Michaels ..................... 715/700 |

FOREIGN PATENT DOCUMENTS

| EP | 0122.043 | 10/1984 |
| EP | 0672.892 | 4/1995 |
| JP | 62059812 | 3/1987 |

* cited by examiner

*Primary Examiner*—Brent Swarthout
(74) *Attorney, Agent, or Firm*—Michael I Kroll

(57) ABSTRACT

A control panel and/or dashboard display system which allows a user to selectively configure at least one of position and characteristic, items displayed on the control panel and/or dashboard display system. A system is provided and includes an interactive database of menu items that is accessible by the user for selecting the items to be displayed on the control panel and/or dashboard display system using touch screen technology or actuatable buttons to select the desired displayed items and the appearance of the displayed items. The user has the ability to save the customized configurations to memory and to lock out change. Further provides for applications wherein said control/panel and/or dashboard display systems are used in multiple locations.

24 Claims, 10 Drawing Sheets

CONFIGURABLE CONTROL PANEL AND/OR DASHBOARD DISPLAY

BACKGROUND OF THE INVENTION

1. Field of the Invention

The present invention relates to a display system in a land, marine or air vehicle and, more specifically, to a control panel and/or dashboard display system which allows a user to selectively configure at least one of position and characteristic, items displayed on the control panel and/or dashboard display system. A system is provided and includes an interactive database of menu items that is accessible by the user for selecting the items to be displayed on the control panel and/or dashboard display system using touch screen technology or actuatable buttons to select the desired displayed items and the appearance of the displayed items. The user has the ability to save the customized configurations to memory and to lock out change. The present invention further provides for applications wherein a plurality of said control/panel and/or dashboard display systems are used in multiple locations as on a ship's bridge and flying bridge and/or engine room.

2. Description of the Prior Art

Numerous other display systems exist in the prior art. Typical of these are U.S. Pat. Nos. 3,659,283; 4,442,424; 4,594,572; 4,630,043; 5,278,532; 6,253,122; 6,667,726; and International Patent Applications EP 0122043; JP 62059812; EP 0672891. While these display systems may be suitable for the purposes for which they were designed, they would not be as suitable for the purposes of the present invention, as hereinafter described.

U.S. Pat. No. 3,659,283

Inventor: David Ophir

Issued: Apr. 25, 1972

Apparatus for providing a raster display of static data. A plurality of static data characters, for example in binary coded decimal form, is passed, a character at a time, by a parallel to serial converter to a read-only memory which converts each character into 20 eight-bit scan lines and transfers one scan line at a time to a video signal generator. The signal generator applies each bit to a raster display output device. The high cyclic rate results in the simultaneous display of all the static data characters. If desired, the display size, color, or intensity can be varied or the display can be caused to blink or flash, all on a display line by display line basis.

U.S. Pat. No. 4,442,424

Inventor: Shinji Shirasaki et al.

Issued: Apr. 10, 1984

A plurality of engine operating parameters and useful information items are monitored by respective sensors. A control unit receives signals from the sensors to display the monitored items in a variable format on a single viewing screen in accordance with the conditions of the monitored items. Abnormal condition of the monitored items is detected by the control unit to enlarge the display format to give a warning indication. A pushbutton is provided for each of the monitored items to generate a display command signal in response to a manual command to provide a display of a desired item in an enlarged format.

U.S. Pat. No. 4,594,572

Inventor: Georg Haubner, et al.

Issued: Jun. 10, 1986

To provide for optical indication of output values relating to the operating conditions, or other parameters for display on the dashboard of a display panel, for example on automotive vehicles, a display panel (10) has a plurality of indicating blocks (15a . . . . 15k) distributed thereover. A logic circuit, for example provided by a micro-processor (12) supplies data over data busses (21, 41) to the respective indicating blocks, which can be connected in series (FIGS. 2, 4) or in parallel (FIGS. 5-7). The logic circuit is connected through suitable connecting lines (13) with sensor inputs, providing ambient, or operation or operating data. The logic circuit, additionally, generates data of its own, for example time outputs. The indicating blocks each include a shift register (17, 18, 50) which is connected to a data line, the stages of the shift register being connected to respective indicating elements (16, 53) which, together, formed the indicating blocks—for example LCD elements—so that the shift state of the respective shift register will provide suitable output indications. For example, if a shift register has eight positions, and four sequential positions have a 1-signal and four other sequential positions have a zero-signal, a line can be displayed representative of half-full state of a fuel tank.

U.S. Pat. No. 4,630,043

Inventor: Geroge Haubner, et al.

Issued: Dec. 16, 1986

A modular, space-saving vehicle data acquisition and dashboard display system, comprising analog and/or digital sensors (30, 31, 32) connected to a central control logic (14) which is in turn connected over a single digital data line to a plurality of control modules (26) including microprocessors (28) and connected to individual display elements (29) such as liquid-crystal displays. The system includes a travel data read-out (21) which can be interrogated using a keyboard (27) as a flashing light, to alert individuals in an area surrounding the apparatus when an emergency situation exists.

U.S. Pat. No. 5,278,532

Inventor: Ronald Hegg, et al.

Issued: Jan. 11, 1994

A compact, inexpensive and mass-producible optical display system for an automobile creates a highly visible and sharp, high contrast and pleasing, multi-color magnified virtual image of a primary instrument cluster at a viewing distance which is greater than the actual optical distance between the dashboard and the driver's eyes in order to enhance instrument readability, minimize driver eye strain, and reduce eye focus problems which are associated with transitioning between the far range viewing used for watching the road ahead and the near range viewing used for glancing at the instruments. A non-pupil forming display system uses a single off-axis aspherical mirror with power to create a virtual image of a miniaturized, multi-color passive image source, such as a segmented LCD panel, which is backlighted by a small filament incandescent light bulb. The aspheric surface is optimized to minimize aberrations and reduce vertical disparity and field curvature. The image source is predistorted to compensate for distortion in the off-axis configuration. A holographic diffusing screen element laminated onto the image source provides uniform high brightness and uniform contrast over the entire field-of-view which is visible from an ellipse sufficient to accommodate most of the driver population, minimizes the visual impact of any optical aberrations near the edge of the viewing area, and provides the non-pupil forming system with some of the desirable optical properties of a pupil forming system.

U.S. Pat. No. 6,253,122

Inventor: Behfar Razavi, et al.

Issued: Jun. 26, 2001

A dashboard for a vehicle, comprising a monitor which displays graphical images depicting dashboard instruments. In one embodiment, the monitor is a general purpose LCD graphics display coupled to a graphics generator. The graphics generator is a processor which executes a virtual dashboard software application. The processor receives vehicle information such as speed, fuel level, mileage and battery charge, and processes this information using the virtual dashboard software application to generate graphics signals which are transmitted to the monitor for display to the driver. The images displayed to the driver are determined by the virtual dashboard application, and not by the monitor itself. The displayed images are user-selectable so that they can be varied to suit the preferences of different drivers. The driver may alternately select different groups of images to view on the monitor using touch screens or speech commands.

U.S. Pat. No. 6,667,726

Inventor: Sergio Damiani, et al.

Issued: Dec. 23, 2003

The display device has a pair of liquid crystal, colour display units fitted to the dashboard of the vehicle to display information; a memory; a "track-ball" data selection unit adjacent to the gear lever; and a processing unit cooperating with the memory and the data selection unit, and controlling the display units. In particular, by means of the "track-ball" data selection unit, the driver of the vehicle may change and freely adapt to his own requirements information display parameters such as type, size, colour and style of representation, by selecting from a number of items in a menu shown on the display units and memorized in the memory.

European Patent Application Number EP 0122043

Inventor: Michael Williams et al.

Issued: Oct. 17, 1984

An information display for a motor vehicle carries the usual primary information such as vehicle speed and mileage elapsed and in addition carries symbols which light up to indicate certain secondary functions such as high beam headlamp on, low beam headlamp on, rear fog lamp on. In order to assist the driver, the information display has a button which, when pressed by the driver, causes text to be illuminated adjacent to whatever secondary information symbol is illuminated, which text explains what the symbol means. The display is simple to operate and of value to the inexperienced driver.

Japanese Patent Number JP62059812

Inventor: Osamu Douhira, et al.

Issued: Mar. 16, 1987

To display necessary information without fail even if wrong display change-over operation takes place while traveling by providing a display control means to forbid the changeover from a selected pattern to another pattern. CONSTITUTION: A display device is provided to an instrument panel of a vehicle and changes over and displays information of every kind in different combination for every pattern according to plural patterns preset by a multiple display means 11. Further, the pattern displayed by the multiple display means 11 by display selection means 51-53 is optionally selected to change over the display. Then, the changeover of the pattern displayed by the multiple display means 11 is controlled by a display control means 21 based on a travel detection means 39 detecting a traveling state of a vehicle and a signal from the detection means 39. In other words, the display control means 21 selects the changeover to another pattern and acts to forbid the changeover to another pattern. Accordingly, the changeover is not performed and the information required for traveling is always displayed even if an operator changes over the pattern in error during traveling.

European Patent Application Number EP 0672892

Inventor: Masanori Konishi, et al.

Published: Sep. 20, 1995

An image data operating device for a vehicle which displays information about the vehicle on the on-vehicle display device (10). This device incorporates a mode setting section (32) for setting traveling and stopping modes and a data operating section (34) which performs arithmetic operation for a mode screen. The section (34) performs arithmetic operation for a traveling mode screen on which the traveling state of the vehicle when the traveling mode is set and for stopping mode screen on which the detail information about the vehicle when the stopping mode is set. Therefore, the traveling mode screen, which is prepared by giving priority to the legibility, can be displayed on the display device (10) in the traveling mode; the stopping mode screen which is prepared by giving priority to the contents can be displayed on the device (10) in the stopping mode.

SUMMARY OF THE PRESENT INVENTION

The present invention is a control panel and/or dashboard display system which allows a user to selectively configure at least one of position and characteristic, items displayed on the control panel and/or dashboard display system. A system is provided and includes an interactive database of menu items that is accessible by the user for selecting the items to be displayed on the control panel and/or dashboard display system using touch screen technology or actuatable buttons to select the desired displayed items and the appearance of the displayed items. The user has the ability to save the customized configurations to memory and to lock out change. The present invention further provides for applications wherein a plurality of said control/panel and/or dashboard display systems are used in multiple locations.

A primary object of the present invention is to provide a control panel and/or dashboard display system that overcomes the shortcomings of the prior art.

Another, secondary object of the present invention is to provide a control panel and/or dashboard display system enabling a user to configure the display of a plurality of items in the control panel and/or dashboard display.

Still another object of the present invention is to provide a control panel and/or dashboard display system that enables a user to selectively vary the size of the entire control panel and/or dashboard display area.

Another object of the present invention is to provide a control panel and/or dashboard display system that enables a user to selectively vary the size of the individual items displayed on the control panel and/or dashboard display.

Still yet another object of the present invention is to provide a control panel and/or dashboard display system wherein the user is able to determine the location on the control panel and/or dashboard display of the selected displayable items.

Another object of the present invention is to provide a control panel and/or dashboard display system with a user selected lockout so that the display, once set, cannot be changed.

An additional object of the present invention is to provide a control panel and/or dashboard display system that enables the user to selectively control elements like the radio, CD, GPS, cell phone and transmission. Such elements can be accessed by touch screen technology. The touch screen capability can be turned on and off.

Yet another object of the present invention is to provide a control panel and/or dashboard display system that enables the user to selectively vary the color of the entire control panel and/or dashboard display area.

Still another object of the present invention is to provide a control panel and/or dashboard display system that enables a user to selectively vary the color of the individual items displayed on the control panel and/or dashboard display.

Another object of the present invention is to provide a control panel and/or dashboard display system wherein each potentially displayable item is included in at least one menu.

A further object of the present invention is to provide a control panel and/or dashboard display system whereby the control panel and/or dashboard display is able to be modified while the vehicle is in motion.

Still another object of the present invention is to provide a control panel and/or dashboard display system whereby the control panel and/or dashboard display may be altered at any speed.

Yet another object of the present invention is to provide a control panel and/or dashboard display system that that can display and configure global positioning satellite navigational information.

A further object of the present invention is to provide a control panel and/or dashboard display system whereby the global positioning satellite navigational display is usable under any vehicle operating condition.

Still yet another object of the present invention is to provide a control panel and/or dashboard display system that is hardwired into the vehicle.

Yet another object of the present invention is to provide a control panel and/or dashboard display system that permits wireless transmission of configuration signals.

Another object of the present invention is to provide a control panel and/or dashboard display system as a separate control module that is permanently or wirelessly integrated into the vehicle's system wherein said vehicle includes land, marine or air vehicles.

An additional object of the present invention is to provide a control panel and/or dashboard display system that provides additional screen elements in the separate control module that can be dragged and dropped onto the control panel and/or dashboard display system.

Another object of the present invention is to provide a control panel and/or dashboard display system that includes a menu selector that is easily accessible by a user.

Still another object of the present invention is to provide a control panel and/or dashboard display system that allows a user to save a desired configuration.

Another object of the present invention is to provide means for configuring and updating the control panel and/or dashboard display system using the accessory control module.

An additional object of the present invention is to provide updates for the control panel and/or dashboard display on media, such as CD or DVD.

Another object of the present invention is to provide a control panel and/or dashboard display system that is used in multiple locations as on a ship's bridge and flying bridge and/or engine room.

Yet another object of the present invention is to provide a control panel and/or dashboard display system that is simple and easy to use.

Still another object of the present invention is to provide a control panel and/or dashboard display system that is inexpensive to manufacture and operate.

The foregoing and other objects and advantages will appear from the description to follow. In the description reference is made to the accompanying drawing, which forms a part hereof, and in which is shown, by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
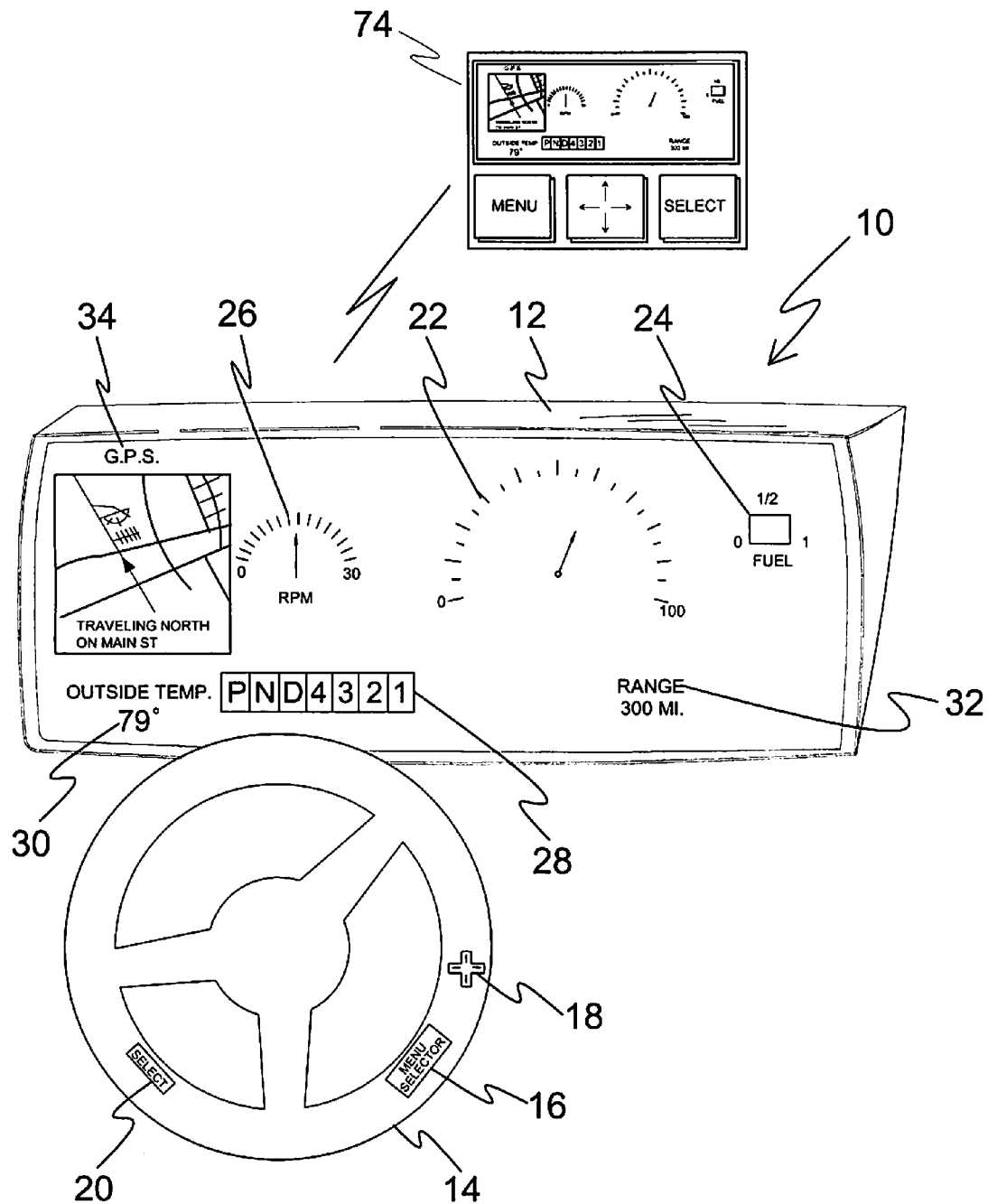
FIG. 1 is an illustrative view of a dashboard and steering wheel of the dashboard display system of the present invention.

Turning now descriptively to the drawings, in which similar reference characters denote similar elements throughout the several views, the Figures illustrate the dashboard display system of the present invention. With regard to the reference numerals used, the following numbering is used throughout the various drawing Figures.

- 10 control panel and/or dashboard display system of the present invention
- 12 control panel and/or dashboard display
- 14 Steering wheel
- 16 menu selector button
- 18 Navigation arrows
- 20 selector button
- 22 Speed indicator
- 24 fuel indicator
- 26 Revolutions per minute indicator
- 28 gear indicator
- 30 outside temperature indicator
- 32 range indicator
- 34 GPS display
- 36 GPS selector
- 38 user
- 40 speed indicator menu
- 42 measurement sub-menu
- 44 color sub-menu
- 46 size sub-menu
- 48 location sub-menu
- 49 display type
- 50 exit button
- 52 mile information menu
- 54 mile information sub-menu
- 56 navigation processor
- 58 database
- 60 display processor
- 62 vehicle computer
- 64 selection signal
- 66 display signal
- 68 navigational signal
- 70 first transceiver
- 72 second transceiver
- 74 accessory control module

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments as practitioners skilled in the art will recognize numerous other embodiments as well. For definition of the complete scope of the invention, the reader is directed to appended claims.

Referring to FIG. 1, shown is the display system that can be used in land, marine or air vehicles. The control panel and/or dashboard display system 10 allows a user to selectively configure operative controls for the aforementioned vehicles into a more intuitive arrangement using drag and drop and touch screen technology. As an example for a motor vehicle, any of the vehicle's operative functions can be incorporated into a user defined control panel and/or dashboard display 12 that may include sensor reporting, such as fuel status 24, fuel range 32, outside temperature 30, tachometer 26, speedometer 22, GPS derived location 36, mapping 34 etc. and functional control of devices, such as transmission 28, lights and communications devices. Operative controls which currently have a dedicated display device can be incorporated into the display including players such as radio, CD, DVD. The control panel and/or dashboard display system provides modification of at least one of position and characteristic of items displayed on the control panel and/or dashboard display, such as location on the display and color of the item displayed. The system provides an interactive database of menu items that is accessible by the user 38 via menu selection 16, directional toggle 18, and selector 20, which can be mounted on steering wheel 14. Also shown, is a plug in and/or wireless 76 control module 74 that can be used in lieu of, or in conjunction with, a display 12 for selecting the items to be displayed on the display 12 using touch screen technology or actuatable buttons to select the desired displayed items and the appearance of the displayed items. The user has the ability to save the customized configurations to memory and to lock out change.

Figure 2:
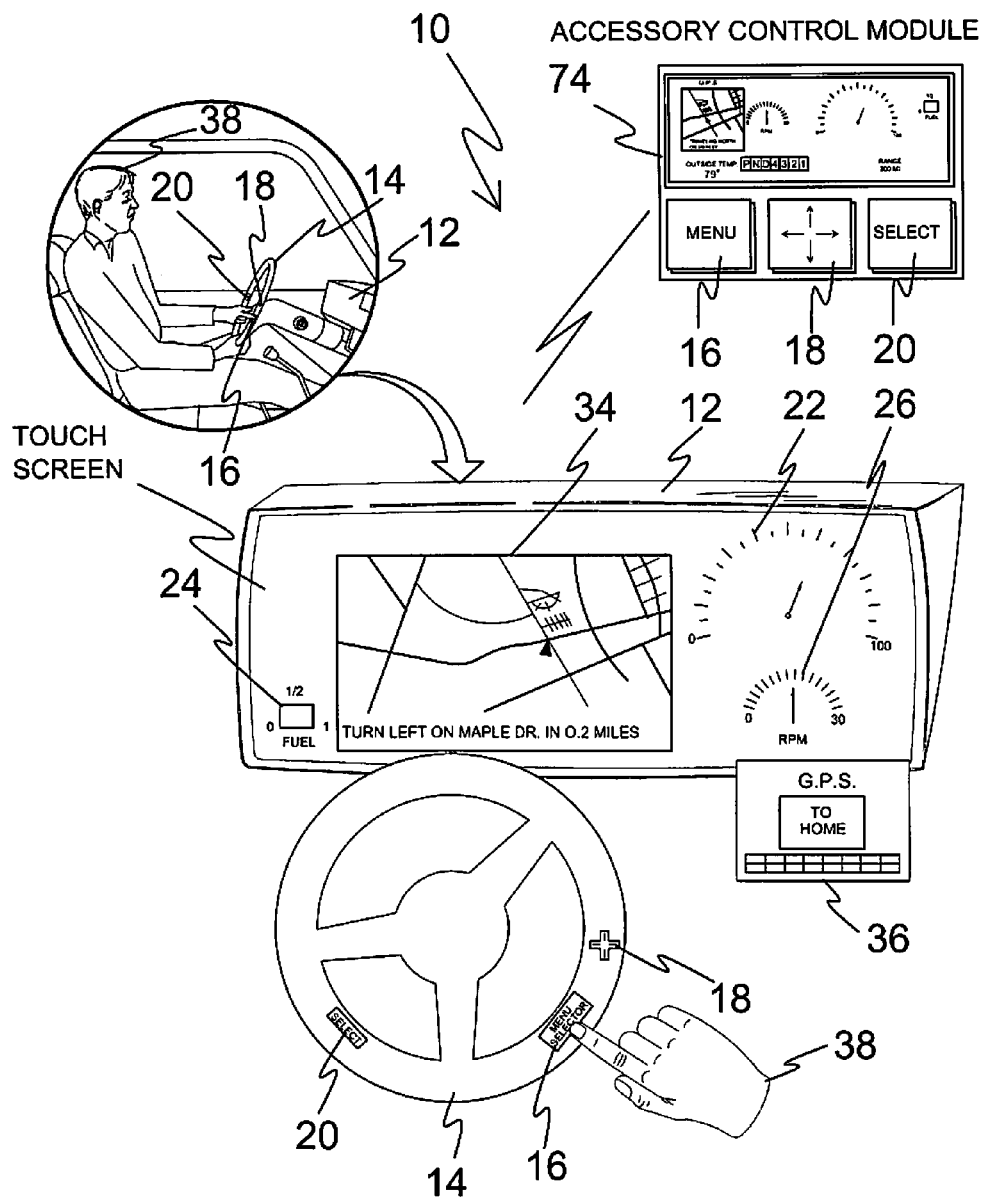
FIG. 2 is an illustrative view of the dashboard display system of the present invention.

Referring to FIG. 2, shown is an illustrative view of the present invention utilized in a motor vehicle application. Illustrated is a motor vehicle application of the configurable control panel and/or dashboard display where any number of sensors, gauges and operative controls can be selectively incorporated into a configurable display for the particular vehicle. The advantages over the prior art of a configurable display includes lower manufacturing and maintenance costs, ease of upgrading when new technologies are introduced, the portability of a standalone module wire or wirelessly connected to the vehicle's control unit and that can be used to update an integral configurable control panel and/or dashboard display. As an example for a motor vehicle, any of the vehicle's operative functions can be incorporated into a user control panel and/or dashboard display 12 that may include sensor reporting, such as fuel status 24, fuel range 32, outside temperature 30, tachometer 26, speedometer 22, GPS derived location 36, mapping 34 etc. and functional control of devices, such as transmission 28 lights, and communications devices. Operative controls which currently have a dedicated display device can be incorporated into the display including players such as radio, CD, DVD. The control panel and/or dashboard display system provides for modification of at least one of position and characteristic of items displayed on the control panel and/or dashboard display, such as location on the display and color of the item displayed. The system provides an interactive database of menu items that is accessible by the user 38 via menu selection 16, directional toggle 18, and selector 20, which can be mounted on steering wheel 14. Also shown, is a plug in and/or wireless 76 control module 74 that can be used in lieu of or in conjunction with a display 12 for selecting the items to be displayed on the display 12 using drag and drop and/or touch screen technology or actuatable buttons to select the desired displayed items and the appearance of the displayed items. The user has the ability to save the customized configurations to memory and to lock out change.

Figure 3:
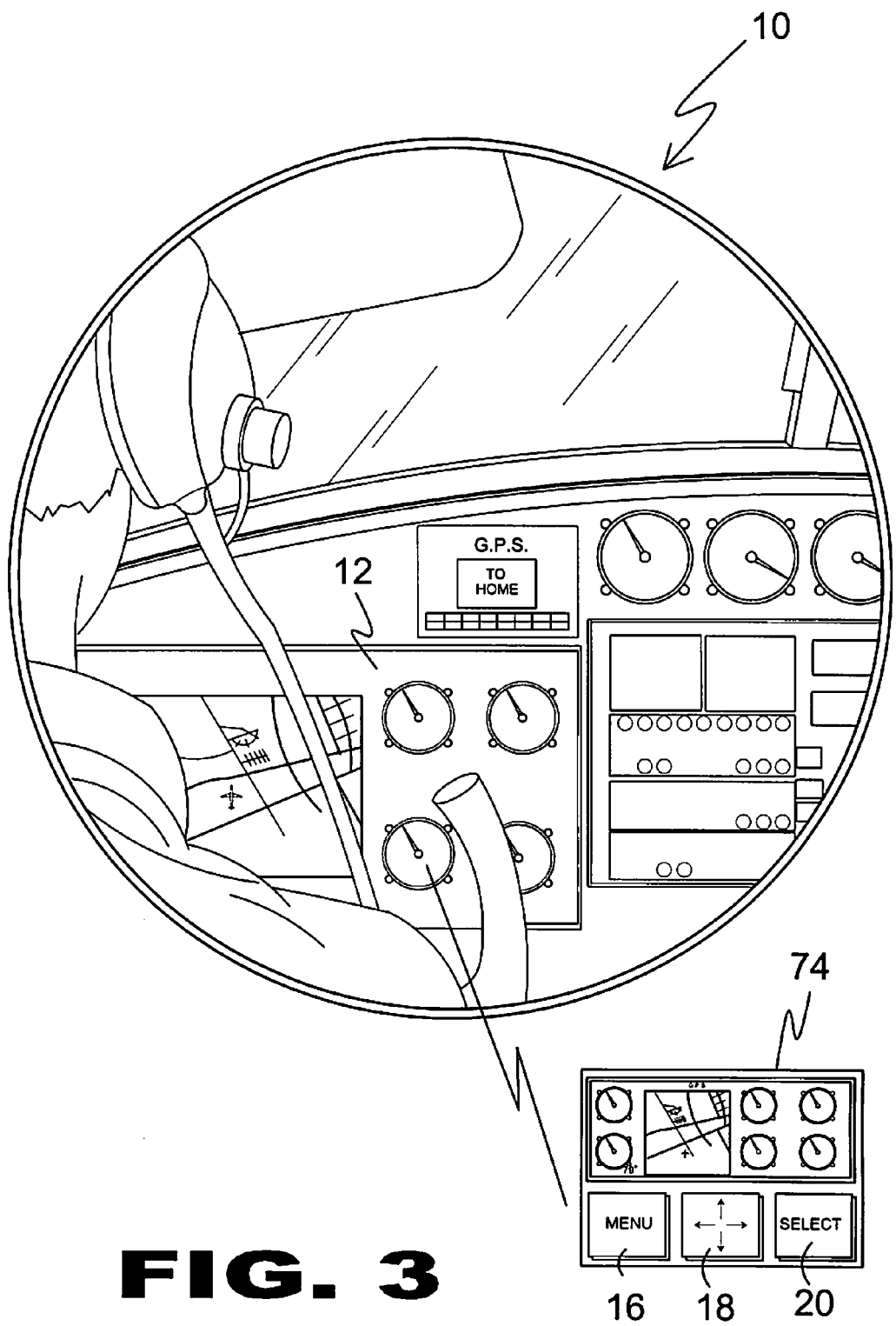
FIG. 3 is an illustrative view of the present invention utilized in an aeronautic application.

Referring to FIG. 3, shown is the present invention utilized in an aeronautical application. Illustrated is an aeronautical application of the configurable control panel and/or dashboard display where any number of sensors, gauges and operative controls can be selectively incorporated into a configurable display for the particular vehicle. The advantages over the prior art of a configurable display includes lower manufacturing and maintenance costs, ease of upgrading when new technologies are introduced, the portability of a standalone module that is wire or wirelessly connected to the vehicle's control unit and that can be used to update an integral configurable control panel and/or dashboard display.

Figure 4:
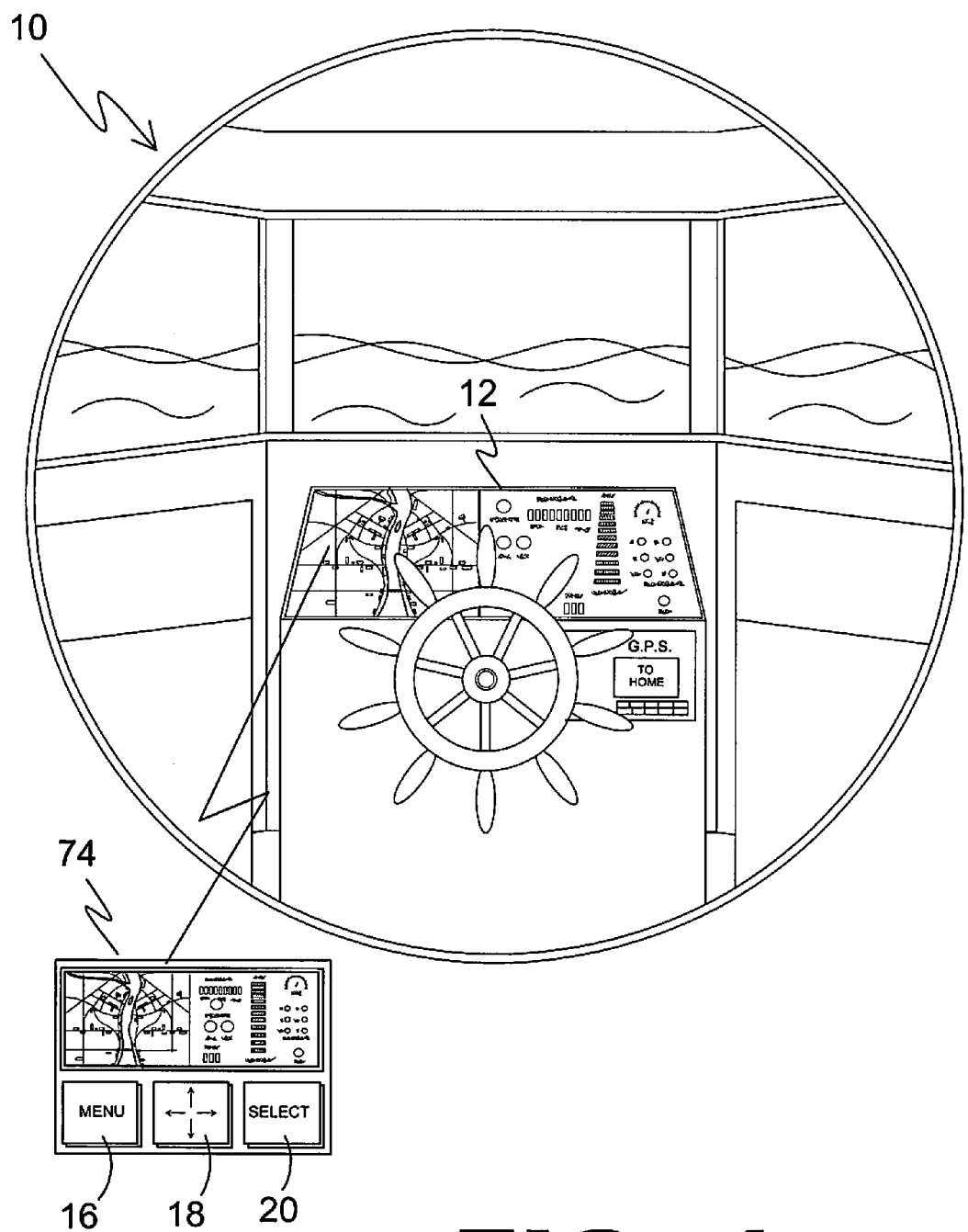
FIG. 4 is an illustrative view of the present invention utilized in a nautical application.

Referring to FIG. 4, shown is an illustrative view of the present invention utilized in a marine application. Any vehicle display having a plurality of indicators, sensors and gauges can be replaced or supplemented with the control panel and/or dashboard display system 10 that allows a user to selectively configure operative controls for the vehicle using an integrated configurable display or standalone module.

Figure 5:
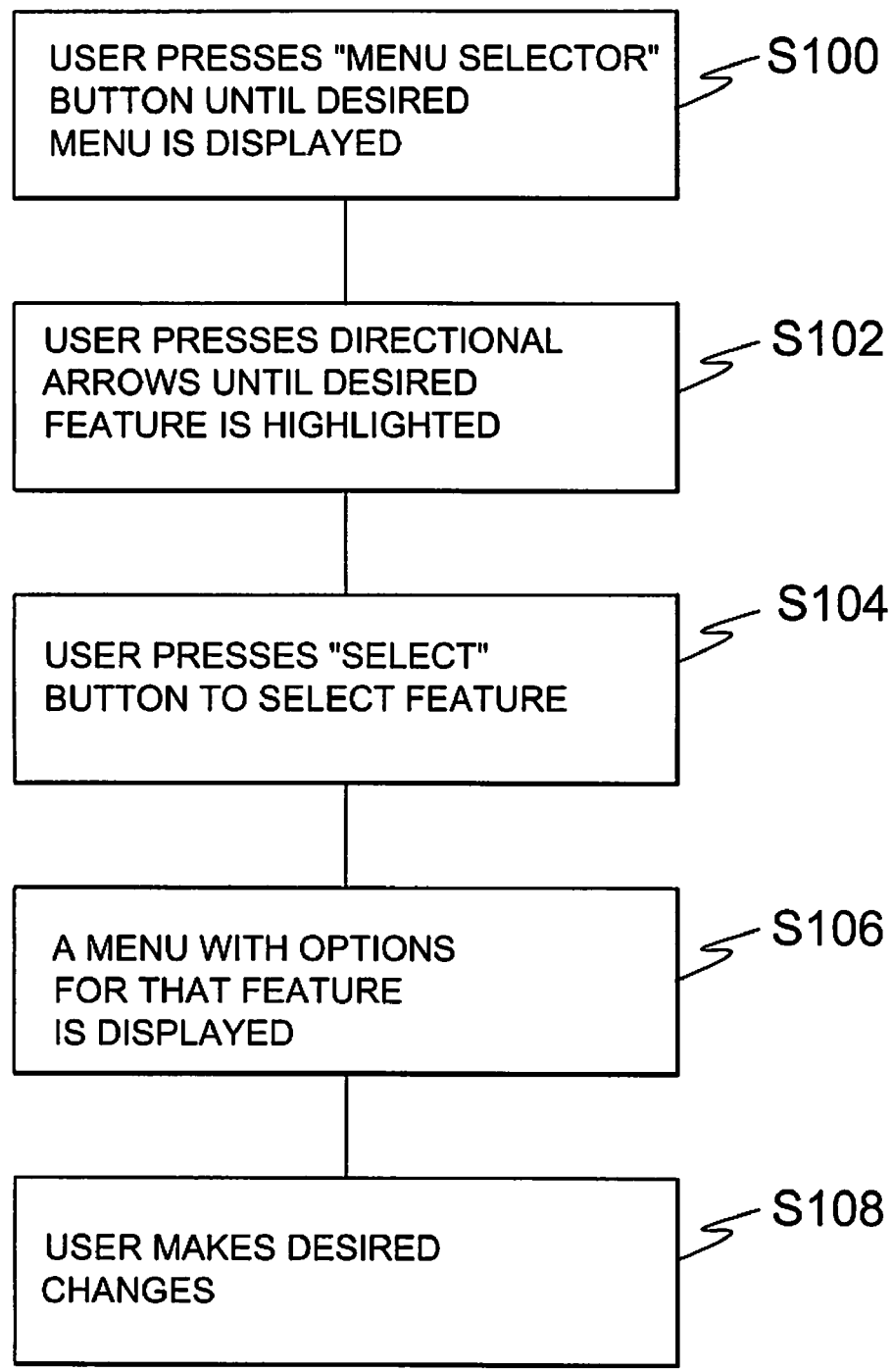
FIG. 5 is flow diagram of the dashboard display system of the present invention.

Referring to FIG. 5, shown is a flow diagram of the dashboard display system of the present invention. In one employment of the present invention, the user is provided with a menu of items related to operative controls of the vehicle and its accessory items. As shown in Step S100, the user presses the menu selector button or icon, in the case of a touch screen implementation, until the desired item is displayed whereupon the user toggles through the available items until selecting the desired item in Step S102 and in Step S104, the feature is selected for display. In Step S106, the feature may have various displayable options to select from that once selected are displayed, as shown in Step S108.

Figure 6:
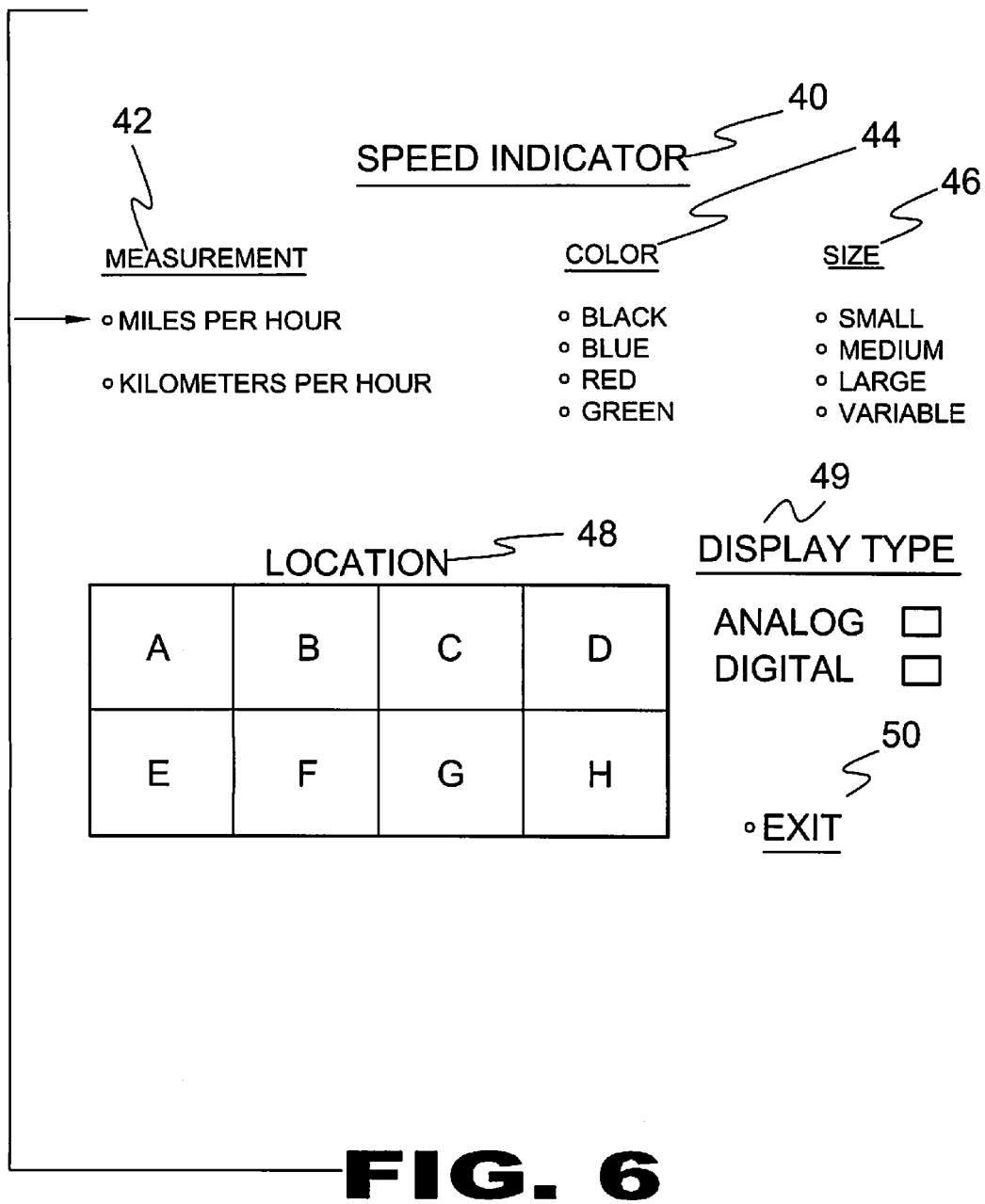
FIG. 6 is an illustrative view of a menu of the dashboard display system of the present invention.

Referring to FIG. 6, shown is an illustrative view of a menu of the dashboard display system of the present invention. Illustrated is another example of an implementation of a menu item for a speed indicator feature display. The menu selectable display features would vary depending on the type of land, marine or air vehicle and as illustrated is representative of potential options, which can apply to all displayable items, for a feature speed indicator 40 is selected from the menu of displayable items and has a plurality of presentational parameters for configuring the final displayed feature, which includes, measurement protocol 42, color selection 44, display size 46, displayed item location 48 and display type 49. Once one or more of the parameters have been specified, exit selection 50 will terminate the speed indicator menu item.

Figure 7:
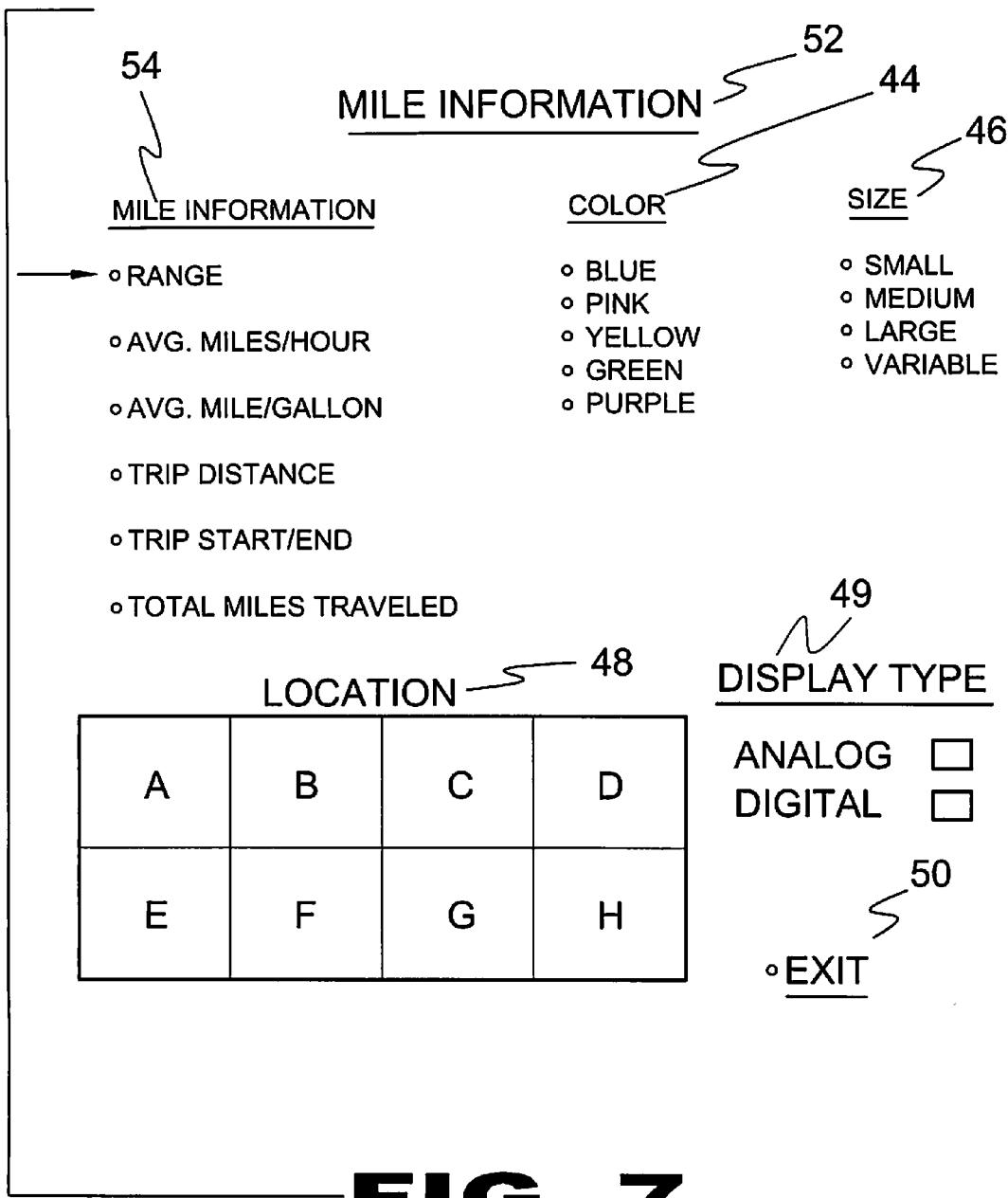
FIG. 7 is an illustrative view of a menu of the dashboard display system of the present invention.

Referring to FIG. 7, shown is an illustrative view of a menu of the dashboard display system of the present invention. Illustrated is one example of an implementation of a menu item for a mile information 52 feature display. The menu selectable display features would vary depending on the type of land, marine or air vehicle and as illustrated is representative of potential options, which can apply to all displayable items, for a feature. Mile information 52 is selected from the menu of displayable items and has a plurality of presentational parameters for configuring the final displayed feature, which includes, mile information 54, color selection 44, display size 46, displayed item location 48 and display type 49. Once one or more of the parameters have been specified, exit selection 50 will terminate the mile information menu item.

Figure 8:
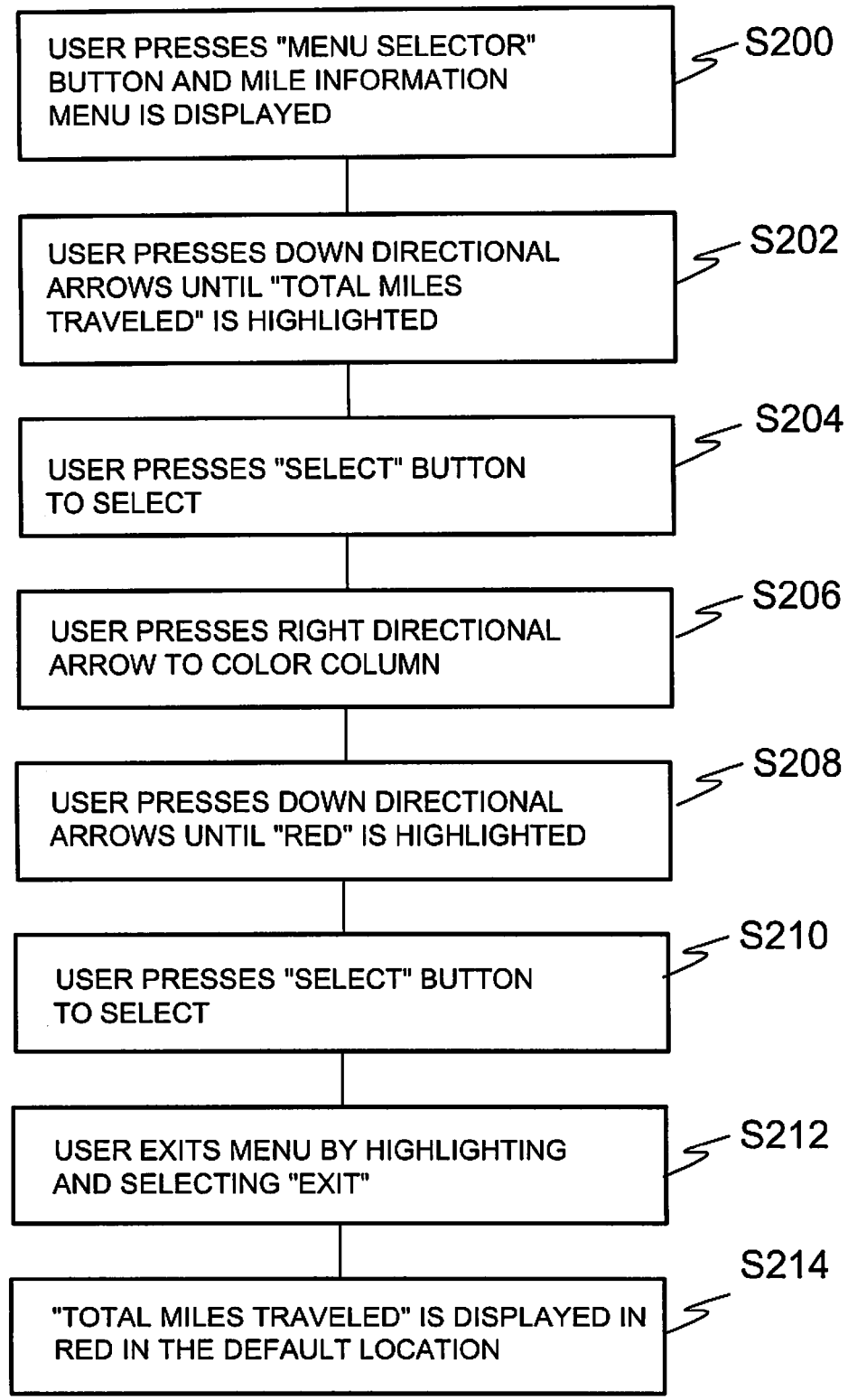
FIG. 8 is a flow diagram of the dashboard display system of the present invention.

Referring to FIG. 8, shown is a flow diagram of the dashboard display system of the present invention. In one implementation of the mile information menu, the user selects the mile information menu using the menu selector button as shown in Step S200 whereupon the user presses the down directional arrow until total miles traveled is highlighted, in Step S202. In Step S204 the user selects the desired mile information 54, and in StepS206 moves to the color selection parameter. In Step S208, the user moves to the desired color and in Step S210 selects the desired color. Once selected, the user selects the exit function, as shown in Step S212, and the selected item in the desired color is displayed on the configurable display screen.

Figure 9:
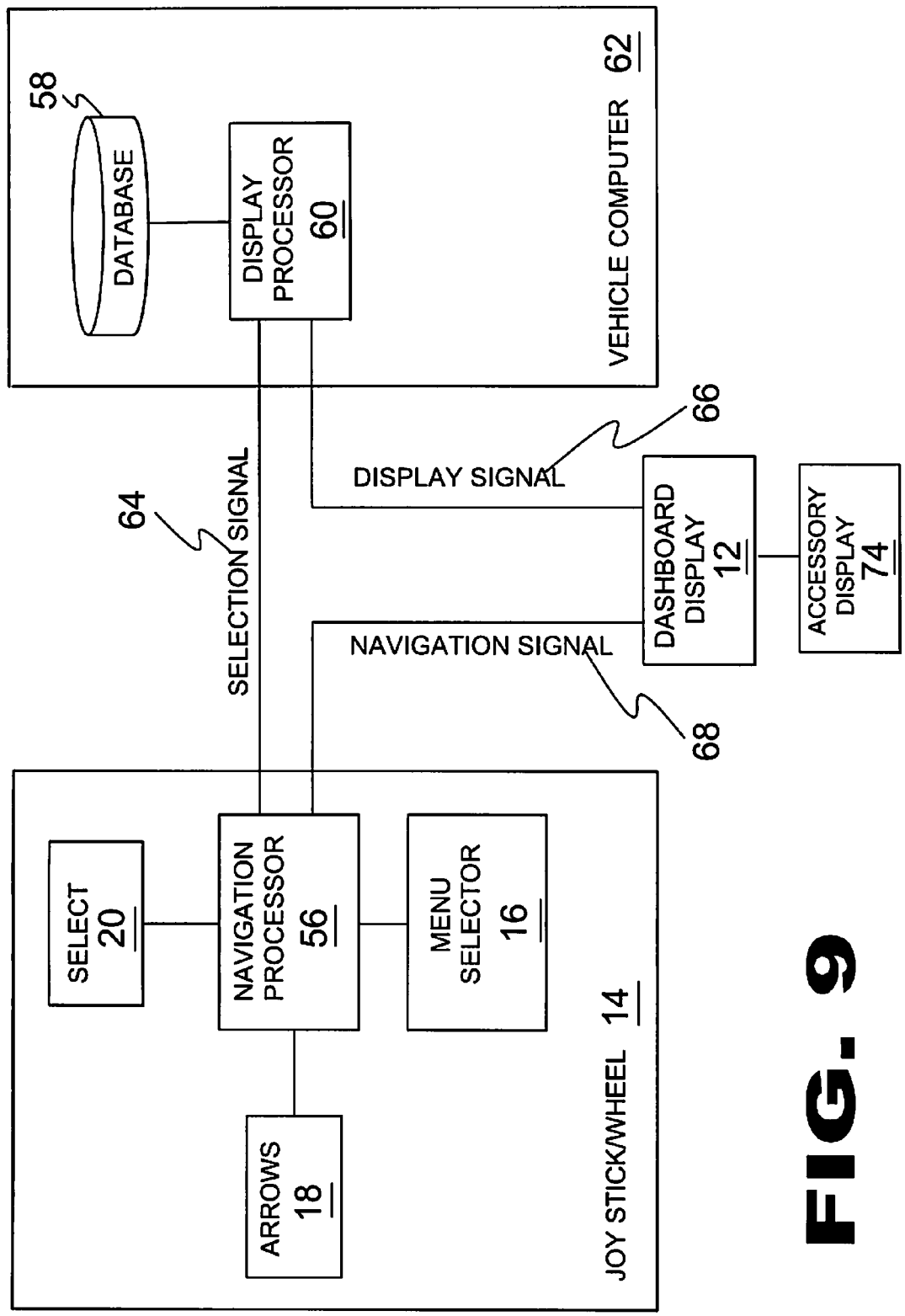
FIG. 9 is a block diagram of a hardwired embodiment of the dashboard display system of the present invention.

Referring to FIG. 9, shown is a block diagram of a hardwired embodiment of the dashboard display system of the present invention for a motor vehicle comprising joy stick/wheel 14, configurable display 12 and vehicle computer 62. As aforementioned, the configurable control panel/dashboard display can form an integral part of a land, marine or air vehicle. Mounted to the joy stick/wheel 14 are control elements for displaying the menu selector 16 using directional arrows 18 to select 20. The navigation processor 56 sends the selection signal 64 to the display processor 60 which retrieves the desired menu/sub menu from database 58 sends the selected item 66 to the dashboard display 12. Also shown is standalone module 74 which can be used as a standalone device to configure or update the display 12.

Figure 10:
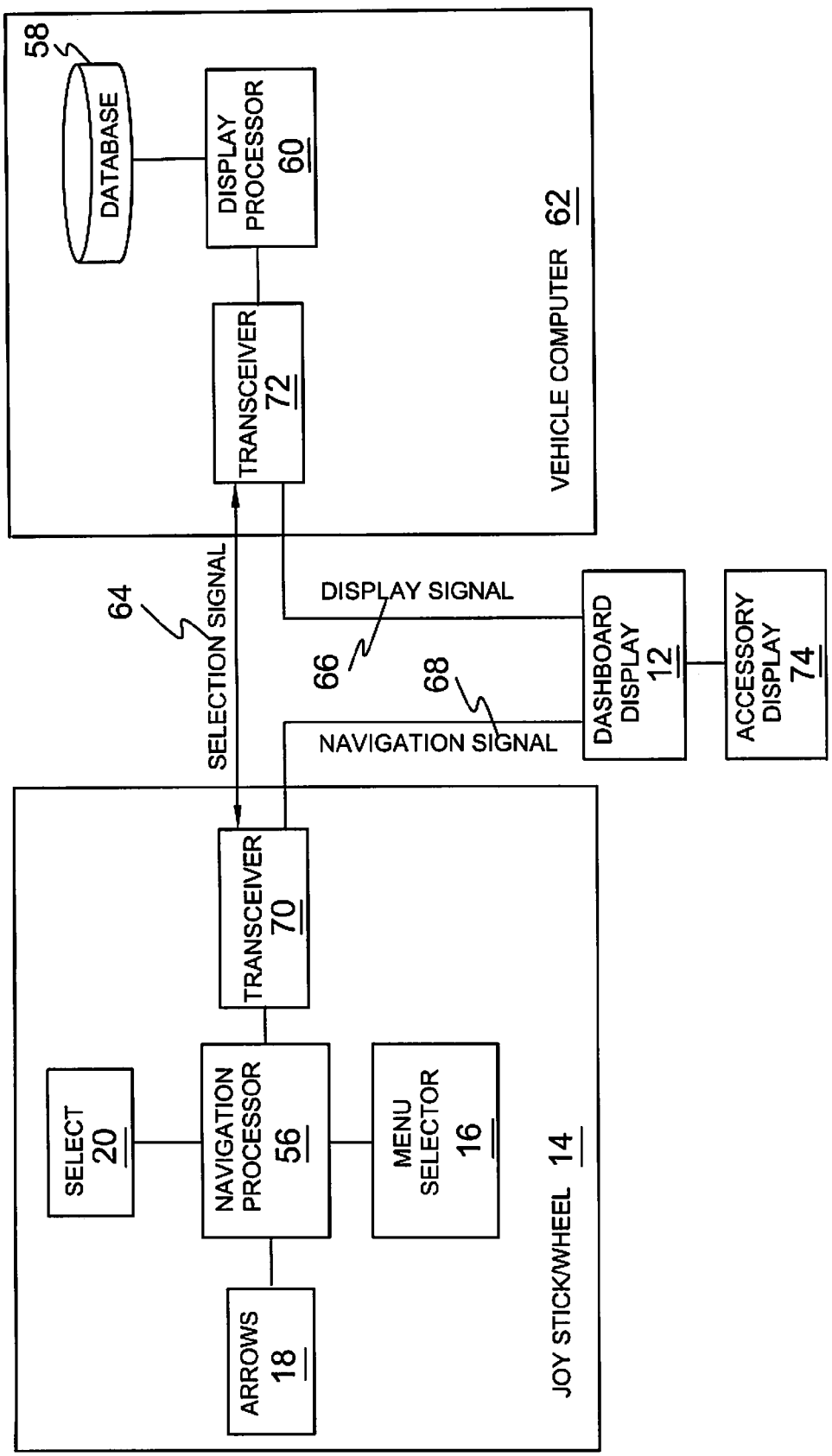
FIG. 10 is a block diagram of a wireless embodiment of the dashboard display system of the present invention.

Referring to FIG. 10, shown is a block diagram of a wireless embodiment of the dashboard display system of the present invention for a motor vehicle comprising joy stick/wheel 14, configurable display 12 and vehicle computer 62. Mounted to joy stick/wheel 14 are control elements for displaying the menu selector 16 using directional arrows 18 to select 20 the desired item whereby transceiver 70 wirelessly transmits selection signal 64 to transceiver 72 which uses display processor 60 to retrieve the desired item from database 58 which is transmitted to display 12. Also shown is standalone module 74 which can be used as a standalone device to configure or update display 12.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A configurable control panel and dashboard display in a vehicle including land, marine and air vehicles comprising:
   a) a stand alone electronic display screen for selectively configuring and displaying sensor and control elements on said dashboard display;
   b) a database of menu items displayable on said electronic display screen;
   c) a display processor capable of executing application programs that is in communication with said electronic display screen and said database of menu items whereby a user can selectively configure a display using said menu items for said vehicle;
   d) the configurable control panel and dashboard display being programmed to receive operating information from said vehicles and control operation of the user selected vehicle functions; and
   e) said stand alone electronic display screen including a control module in communication with said dashboard display for duplicating the display on said electronic display screen in remote locations, for selecting items to be displayed on said dashboard display, and for updating information on said dashboard display.

2. The configurable control panel and dashboard display of claim 1, wherein said electronic display screen and control module form an integral part of the aforementioned vehicles.

3. The configurable control panel and dashboard display of claim 2, wherein said module has an interface with a control system of said vehicle.

4. The configurable control panel and dashboard display of claim 3, wherein said interface is a cable that plugs into the vehicle's control system.

5. The configurable control panel and dashboard display of claim 3, wherein said interface is hardwired into the vehicle's control system.

6. The configurable control panel and dashboard display of claim 3, wherein said interface is a wireless connection between the configurable control panel and dashboard display and the vehicle's control system.

7. The configurable control panel and dashboard display of claim 3, wherein the database of menu items may be updated from CD, DVD, PDA, and RF/satellite transmission.

8. The configurable control panel and dashboard display of claim 1, wherein the size of the display is configurable and reconfigurable.

9. The configurable control panel and dashboard display of claim 8, wherein the menu items are positionable and repositionable on the display.

10. The configurable control panel and dashboard display of claim 9, wherein the user is able to elect the location of selected displayable item on the display.

11. The configurable control panel and dashboard display of claim 9, wherein a displayable menu item has multiple selectable appearances.

12. The configurable control panel and dashboard display of claim 11, wherein a displayable menu item has an optional analog device appearance for gauges, sensors, indicators and switches.

13. The configurable control panel and dashboard display of claim 12, wherein a displayable menu item has an optional digital appearance for gauges, sensors, indicators and switches.

14. The configurable control panel and dashboard display of claim 13, wherein a displayable menu item has a color selectable appearance.

15. The configurable control panel and dashboard display of claim 14, wherein the color of the entire display area can be varied.

16. The configurable control panel and dashboard display of claim 15, wherein the menu items are scalable.

17. The configurable control panel and dashboard display of claim 16, wherein the user can save a desired configuration to memory.

18. The configurable control panel and dashboard display of claim 17, wherein the user selected configuration has a lockout to prevent changes to the display.

19. The configurable control panel and dashboard display of claim 18 that processes global positioning satellite information for configuring and displaying said GPS information in real time.

20. The configurable control panel and dashboard display of claim 19, wherein the electronic display screen has buttons for actuating menu and sub menu navigation and selection.

21. The configurable control panel and dashboard display of claim 20, wherein the electronic display screen incorporates touch screen technology for actuating menu and sub menu navigation and item selection.

22. The configurable control panel and dashboard display of claim 21, wherein the electronic display screen incorporates drag and drop technology for configuring the electronic display.

23. The configurable control panel and dashboard display of claim 22, wherein the control module incorporates drag and drop technology to configure or update the control panel or dashboard display.

24. The configurable control panel and dashboard display of claim 1, wherein the configurable control panel and/or dashboard display is used in multiple locations within the same land, marine and air vehicle.

* * * * *